(12) United States Patent
Murata et al.

(10) Patent No.: US 9,216,716 B2
(45) Date of Patent: Dec. 22, 2015

(54) WIPER DEVICE, METHOD FOR MANUFACTURING WIPER DEVICE, AND APPARATUS FOR MANUFACTURING WIPER DEVICE

(75) Inventors: Shinji Murata, Hamamatsu (JP); Kouji Takeuchi, Kosai (JP); Kenta Toriyama, Anjo (JP); So Asano, Nagoya (JP)

(73) Assignee: Asmo Co. Ltd., Shizuoka-Ken (JP)

( * ) Notice: Subject to any disclaimer, the term of this patent is extended or adjusted under 35 U.S.C. 154(b) by 347 days.

(21) Appl. No.: 13/810,173

(22) PCT Filed: May 15, 2012

(86) PCT No.: PCT/JP2012/062421
§ 371 (c)(1),
(2), (4) Date: Jan. 14, 2013

(87) PCT Pub. No.: WO2012/157646
PCT Pub. Date: Nov. 22, 2012

(65) Prior Publication Data
US 2013/0111690 A1 May 9, 2013

(30) Foreign Application Priority Data

May 19, 2011 (JP) .................................. 2011-112679
Feb. 29, 2012 (JP) .................................. 2012-044004

(51) Int. Cl.
*B60S 1/06* (2006.01)
*B60S 1/04* (2006.01)

(52) U.S. Cl.
CPC ................. *B60S 1/06* (2013.01); *B60S 1/0425* (2013.01); *B60S 1/0433* (2013.01); *B60S 1/0436* (2013.01); *B60S 1/0438* (2013.01)

(58) Field of Classification Search
CPC .... B60S 1/0433; B60S 1/0436; B60S 1/0438; B60S 1/0413
USPC .............................. 15/250.27, 250.3, 250.31
See application file for complete search history.

(56) References Cited

U.S. PATENT DOCUMENTS

| | | | |
|---|---|---|---|
| 5,142,941 A | 9/1992 | Amann et al. | |
| 5,261,286 A | 11/1993 | Hayashi | |
| 5,372,449 A * | 12/1994 | Bauer et al. | 403/273 |
| 5,706,547 A * | 1/1998 | Kobayashi | 15/250.3 |
| 6,343,403 B1 * | 2/2002 | Kanazawa | 15/250.3 |
| 6,510,580 B1 * | 1/2003 | Saitou | 15/250.31 |
| 6,718,593 B2 * | 4/2004 | Shido | 15/250.31 |
| 7,249,394 B2 * | 7/2007 | Iwata | 15/250.27 |
| 7,861,364 B2 * | 1/2011 | Powell, Jr. | 15/250.27 |

(Continued)

FOREIGN PATENT DOCUMENTS

| | | |
|---|---|---|
| JP | H3-503873 A | 8/1991 |
| JP | 08-156747 A | 6/1996 |
| JP | 2000-052938 A | 2/2000 |

(Continued)

*Primary Examiner* — Michael Jennings
(74) *Attorney, Agent, or Firm* — Christensen Fonder PA

(57) ABSTRACT

A wiper device includes pivot shafts to which wiper arms are secured, pivot holders, which rotationally support the pivot shafts, coupling shafts, and a pipe frame having cylindrical ends. The cylindrical ends of the pipe frame are coupled to the coupling shafts. The coupling shafts each include a swaging part, which is swaged to the corresponding cylindrical end, and a flat portion, which is located at part of the coupling shaft exposed from the pipe frame. The flat portions have a predetermined angle with respect to the swaging direction of the swaging and are parallel to the axis of the coupling shafts.

4 Claims, 7 Drawing Sheets

(56) References Cited

U.S. PATENT DOCUMENTS

| | | | |
|---|---|---|---|
| 8,281,452 B2 * | 10/2012 | Kawai et al. | 15/250.3 |
| 2002/0069474 A1 * | 6/2002 | Burkard et al. | 15/250.3 |
| 2002/0152574 A1 * | 10/2002 | Machida | 15/250.3 |
| 2004/0226128 A1 * | 11/2004 | Sugiyama | 15/250.31 |
| 2005/0097700 A1 * | 5/2005 | Iwata | 15/250.3 |
| 2010/0146726 A1 * | 6/2010 | Kawai et al. | 15/250.31 |

FOREIGN PATENT DOCUMENTS

| | | |
|---|---|---|
| JP | 2000-344059 A | 12/2000 |
| JP | 2009-179079 A | 8/2009 |
| JP | 4481548 B2 | 6/2010 |

* cited by examiner

WIPER DEVICE, METHOD FOR MANUFACTURING WIPER DEVICE, AND APPARATUS FOR MANUFACTURING WIPER DEVICE

RELATED APPLICATIONS

The present application is a National Phase entry of PCT Application No. PCT/JP2012/062421, filed May 15, 2012, which claims priority from Japanese Patent Application Number 2011-112679, filed May 19, 2011 and Japanese Patent Application No. 2012-044004, filed Feb. 29, 2012, the disclosures of which are hereby incorporated by reference herein in their entirety.

FIELD OF THE INVENTION

The present invention relates to a wiper device provided on, for example, a vehicle, a method for manufacturing a wiper device, and an apparatus for manufacturing a wiper device.

BACKGROUND OF THE INVENTION

A wiper device provided on, for example, a vehicle, rotates pivot shafts by a motor so that wiper arms mounted on the pivot shafts and wiper blades coupled to the wiper arms pivot to wipe a windshield glass.

For example, in a wiper device disclosed in Patent Document 1, pivot shafts are supported by a pair of pivot holders, and coupling shafts coupled to the pair of pivot holders are swaged to both ends of a pipe frame.

PRIOR ART DOCUMENT

Patent Document

Patent Document 1: Japanese Patent No. 4481548

SUMMARY OF THE INVENTION

According to the above-mentioned wiper device, the coupling shafts of the pivot holders are swaged to the pipe frame in a state in which sleeve portions of the pivot holders, which support the pivot shafts, are held with a holding tool such as a chuck. However, since a swaging direction of swaging jigs in a swaging process and the angles of the pivot shafts vary depending on vehicle types, it is necessary to adjust the holding angle depending on the wiper device of different types of vehicles in a case where the coupling shafts are swaged to the pipe frame in a state in which the sleeve portions of the pivot holders are held as in the conventional case. Thus, the process required for swaging is complicated.

Accordingly, it is an objective of the present invention to provide a wiper device that facilitates swaging of coupling shafts of pivot holders to a pipe frame, a method for manufacturing a wiper device, and an apparatus for manufacturing a wiper device.

To achieve the foregoing objective and in accordance with one aspect of the present invention, a wiper device is provided that includes a pivot shaft, to which a wiper arm is secured, a pivot holder, which rotationally supports the pivot shaft and includes a coupling shaft, and a pipe frame, which includes a cylindrical end coupled to the coupling shaft. The coupling shaft includes a swaging portion, which is swaged to the cylindrical end, and a flat portion located at part of the coupling shaft exposed from the pipe frame. The flat portion has a predetermined angle with respect to a swaging direction of the swaging, and is parallel to an axis of the coupling shaft.

In accordance with another aspect of the present invention, a method for manufacturing a wiper device is provided. The wiper device includes a pivot shaft to which a wiper arm is secured, a pivot holder, which rotationally supports the pivot shaft and includes a coupling shaft, and a pipe frame having a cylindrical end. The method includes: providing a flat portion at part of the coupling shaft exposed from the pipe frame, the flat portion having a predetermined angle with respect to a swaging direction and being parallel to an axis of the coupling shaft; inserting the coupling shaft in the cylindrical end; in a state in which the coupling shaft is inserted in the cylindrical end, holding the coupling shaft by bringing a holding tool into surface-contact with the flat portion; and in a state of holding the coupling shaft, swaging the cylindrical end to the coupling shaft in the swaging direction that has the predetermined angle with respect to the flat portion.

In accordance with a further aspect of the present invention, an apparatus for manufacturing a wiper device is provided. The wiper device includes a pivot shaft to which a wiper arm is secured, a pivot holder, which rotationally supports the pivot shaft and includes a coupling shaft, and a pipe frame having a cylindrical end swaged to the coupling shaft. A flat portion is formed at part of the coupling shaft exposed from the pipe frame. The flat portion has a predetermined angle with respect to a swaging direction of swaging and being parallel to the axis of the coupling shaft. The apparatus includes a holding tool for holding the coupling shaft by surface-contact with the flat portion, and a swaging jig for swaging the coupling shaft with the cylindrical end in a state in which the holding tool holds the coupling shaft.

DETAILED DESCRIPTION OF THE PREFERRED EMBODIMENTS (First Embodiment)

A first embodiment of the present invention will now be described with reference to the drawings.

Figure 1:
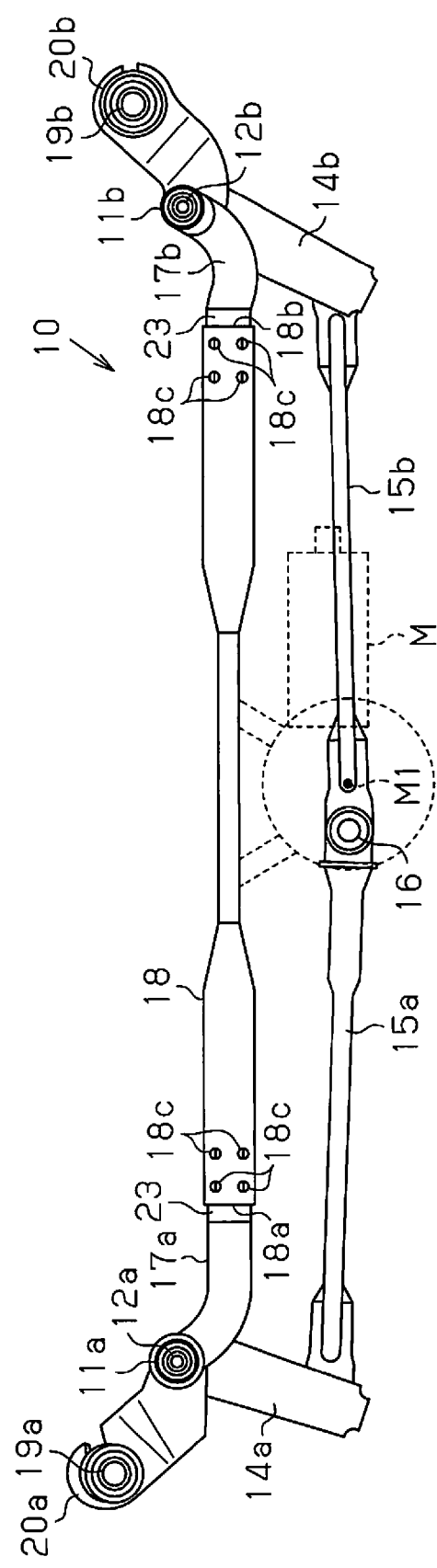
FIG. 1 is a top view illustrating a wiper device according to a first embodiment of the present invention.

As shown in FIG. 1, a wiper device 10 of the first embodiment includes a pair of pivot holders 11a, 11b. The structures of the pivot holders 11a, 11b are basically the same.

The pivot holders 11a, 11b include pivot shafts 12a, 12b, and sleeve portions 13a, 13b, which are substantially cylindrical to rotationally support the pivot shafts 12a, 12b.

An axis K1 of the sleeve portion 13a of the pivot holder 11a, that is, the axis of the pivot shaft 12a has an angle θ1 with respect to an axis L1 of the longitudinal direction of a later described coupling shaft 17a. An axis K2 of the sleeve portion 13b of the pivot holder 11b, that is, the axis of the pivot shaft 12b has an angle θ2 with respect to an axis L1 of a coupling shaft 17b. The axis L1 of the coupling shaft 17b matches with the longitudinal direction of the coupling shaft 17a, which is the axis L1. The angle θ1 is different from the angle θ2. The angles θ1, θ2 vary depending on types of vehicles. The pivot shafts 12a, 12b are mounted on the sleeve portions 13a, 13b such that the axes K1, K2 of the sleeve portions 13a, 13b also have a predetermined angle with respect to a direction perpendicular to the surface of the sheet of the drawing.

The proximal ends of link levers 14a, 14b are respectively secured to the lower ends of the pivot shafts 12a, 12b. The proximal ends of link rods 15a, 15b are supported at the distal ends of the link levers 14a, 14b. A non-illustrated crank arm is secured to an output shaft Ml of a wiper motor M, and the distal ends of the link rods 15a, 15b are rotationally coupled to one end of the crank arm with a joint 16. Thus, when the output shaft Ml of the wiper motor M is rotated, the rotation causes the link levers 14a, 14b to swing to-and-fro via the crank arm and the link rods 15a, 15b. Accordingly, the pivot shafts 12a, 12b rotate in alternating directions within a predetermined angle. The proximal ends of non-illustrated wiper arms are secured to the distal ends of the pivot shafts 12a, 12b. When the pivot shafts 12a, 12b rotate in alternating directions, the wiper arms also rotate in alternating directions and wipe the windshield glass with non-illustrated wiper blades, which are coupled to the distal ends of the wiper arms.

Figure 2:
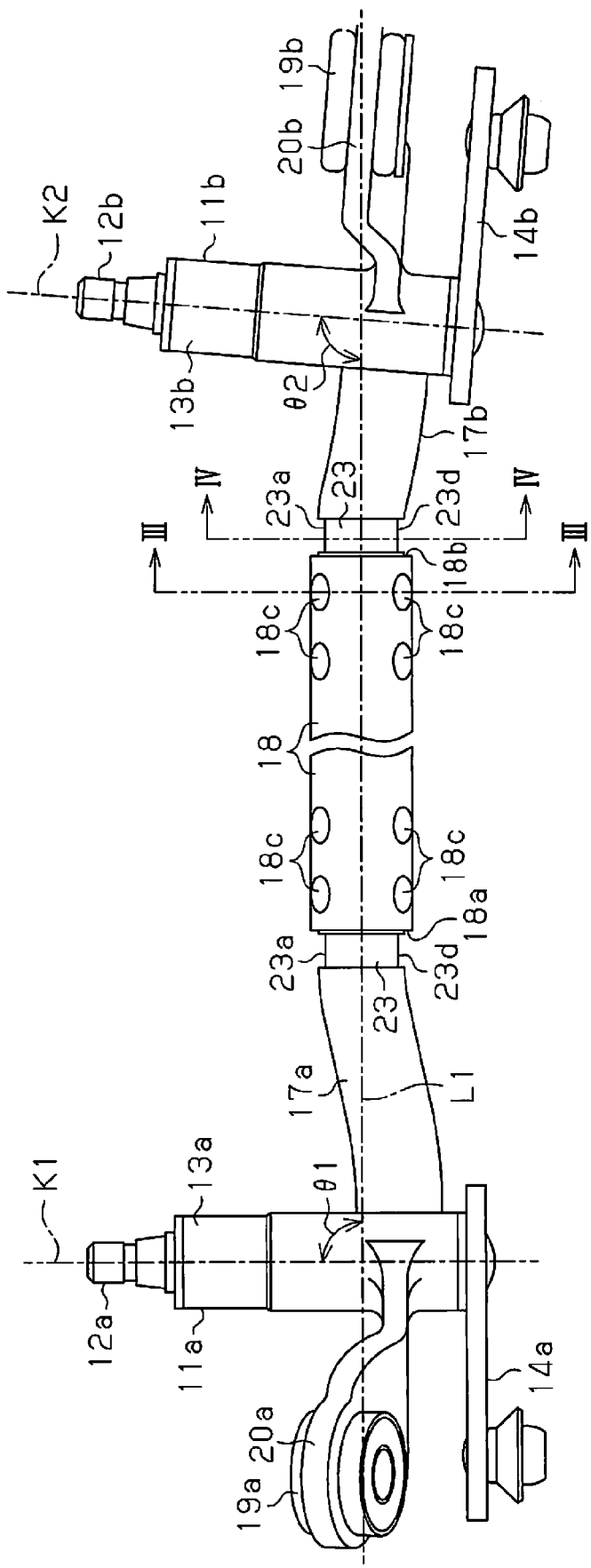
FIG. 2 is a front view illustrating the wiper device of FIG. 1.
Figure 3:
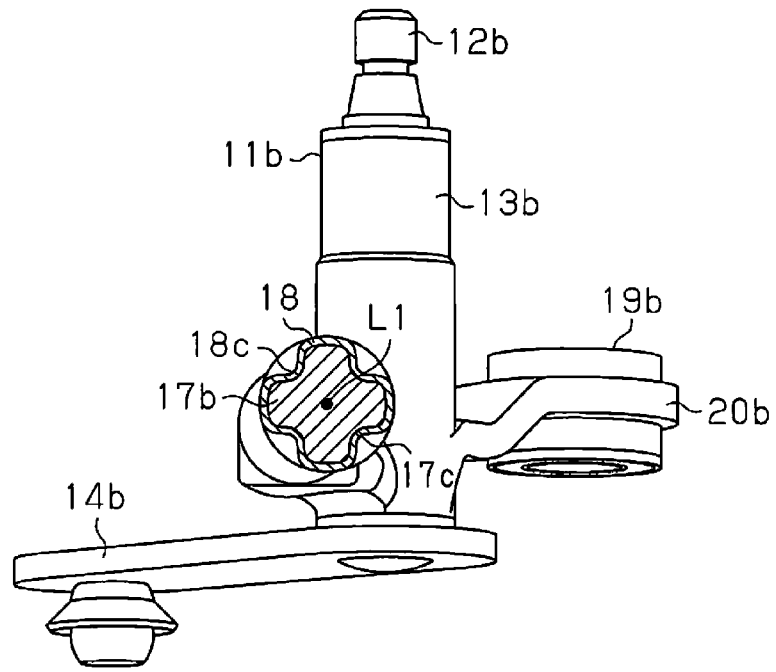
FIG. 3 is a cross-sectional view taken along line III-III of FIG. 2.

Also, the pivot holders 11a, 11b include coupling shafts 17a, 17b, which are coupled to an elongated pipe frame 18. Both ends of the pipe frame 18 are formed to be cylindrical. The coupling shafts 17a, 17b are inserted in cylindrical ends 18a, 18b at both ends of the pipe frame 18. In the inserted state, the pipe frame 18 is swaged with swaging jigs J1, J2 (see FIG. 6) from the outside (outer circumference) of the pipe frame 18 so that the coupling shafts 17a, 17b are securely coupled to the pipe frame 18. As shown in FIG. 3, fitting recesses 17c are previously formed in the coupling shafts 17a, 17b. When swaging, the pipe frame 18 is plastically deformed following the fitting recesses 17c, and fitting protrusions 18c are formed as shown in FIGS. 1 to 3. The fitting protrusions 18c are fit in the fitting recesses 17c. Thus, the pivot holders 11a, 11b are swaged to the cylindrical ends 18a, 18b of the pipe frame 18. The fitting recesses 17c have a concave shape that, at the time when swaging is performed with the swaging jigs J1, J2 discussed below, allows the jigs J1, J2 to be removed from the fitting recesses 17c after the swaging jigs J1, J2 are moved in a swaging direction. The swaging direction refers to a direction in which the opposing swaging jigs J1, J2 approach each other during swaging.

The pivot holders 11a, 11b include mounting portions 20a, 20b. The mounting portions 20a, 20b have mounting bores 19a, 19b. The wiper device 10 is fixed to the vehicle body with fixing bolts (not shown) inserted in the mounting bores 19a, 19b.

Figure 4:
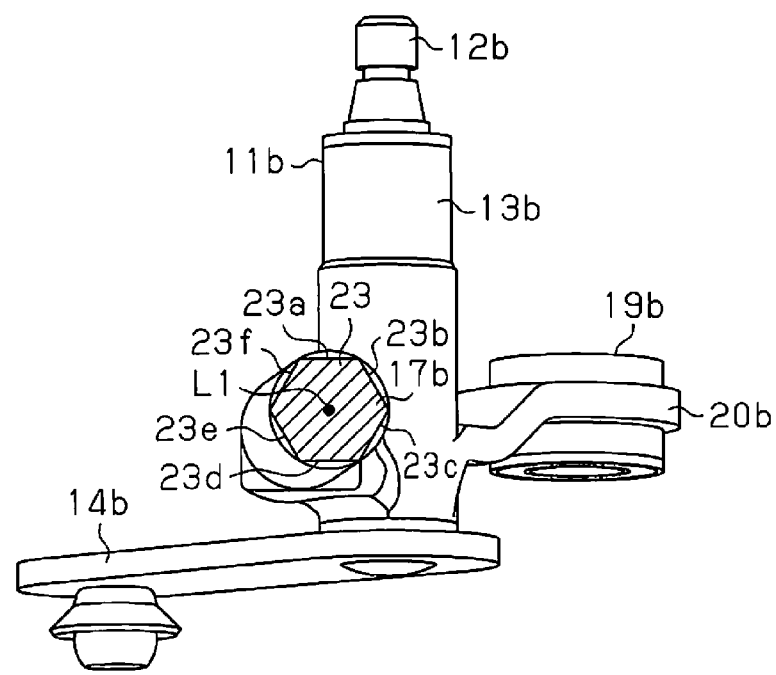
FIG. 4 is a cross-sectional view taken along line IV-IV of FIG. 2.

The coupling shafts 17a, 17b of the pivot holders 11a, 11b will now be described in detail. The structures of the coupling shafts 17a, 17b of the first embodiment are basically the same except that the angles θ1, θ2 of the axes K1, K2 of the pivot shafts 12a, 12b with respect to the axis L1 of the coupling shafts 17a, 17b differ from each other. Thus, the coupling shaft 17b is shown in FIGS. 3 and 4, and illustration of the detailed shape of the coupling shaft 17a is omitted.

The coupling shaft 17b of the pivot holder 11b includes the fitting recesses 17c, which are previously formed to be arranged in the circumferential direction and the longitudinal direction (direction of axis L1) and have a concave shape, as shown in FIGS. 2 and 3. Thus, the fitting protrusions 18c of the pipe frame 18, which are plastically deformed by the swaging jigs J1, J2, and the coupling shafts 17a, 17b are more reliably fitted to each other.

As shown in FIGS. 1 and 2, a position determining portion 23 is formed at part of the coupling shaft 17b of the pivot holder 11b exposed from the pipe frame 18. The position determining portion 23 is formed to have a polygonal cross-section with flat portions 23a to 23f as shown in FIG. 4. In the first embodiment, the position determining portion 23 has a hexagonal cross-section and includes six flat portions 23a to 23f.

The flat portions 23a to 23f are flat surfaces parallel to the axis L1, and have a predetermined angle with respect to the pivot shafts 12a, 12b on which the proximal ends of the wiper arms (not shown) are attached. The position of each of the pivot shafts 12a, 12b is determined by determining the position of the associated position determining portion 23.

Figure 5:
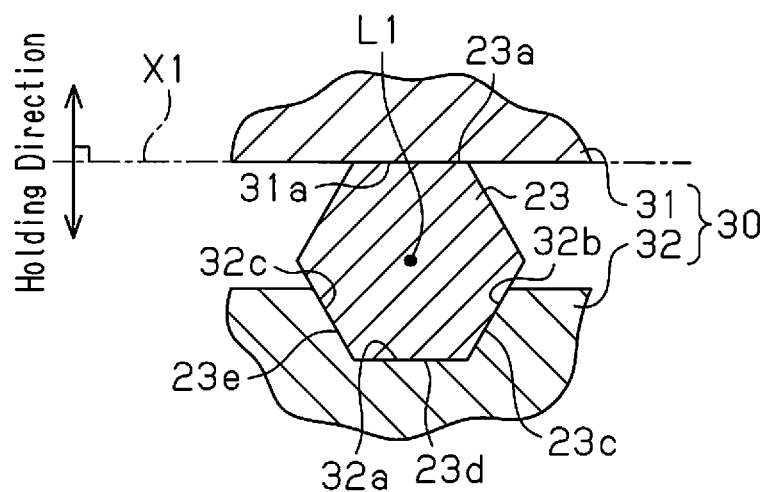
FIG. 5 is an explanatory cross-sectional view of the chuck holding the position determining portion of FIG. 4.
Figure 6:
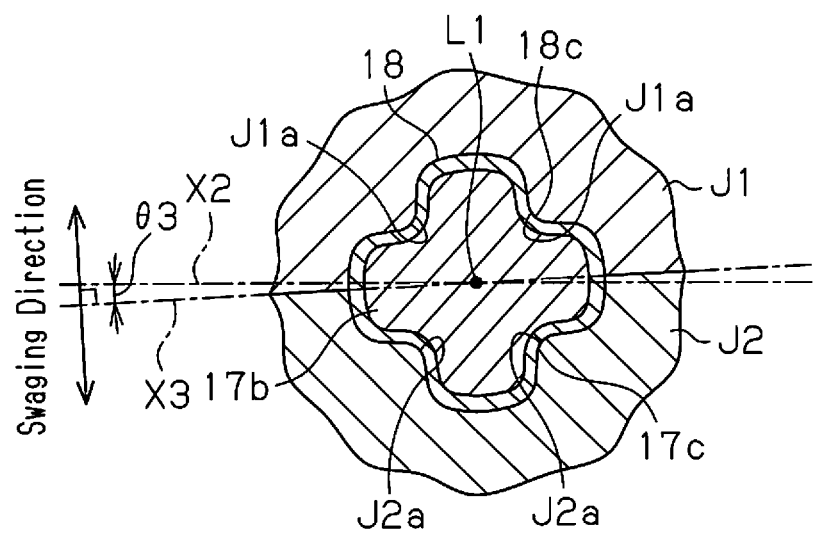
FIG. 6 is an explanatory cross-sectional view of the swaging jigs for swaging the pipe frame of FIG. 3.

As shown in FIG. 4, the flat portions 23a, 23d of the position determining portion 23 are parallel to each other. As shown in FIG. 5, when the position determining portion 23 is held by a corresponding chuck 30, the flat portions 23a, 23d respectively abut against holding surfaces 31a, 32a of an upper chuck member 31 and a lower chuck member 32. As shown in FIGS. 5 and 6, an angle θ3 between a flat surface X2, which is parallel to a flat surface X1 that includes the flat portion 23a (23d) formed on the coupling shaft 17b of the pivot holder 11b, and a flat surface X3, which is perpendicular to the swaging direction of the swaging jigs J1, J2, is set to a predetermined angle. In the first embodiment, the angle θ3 is less than 90 degrees. Likewise, as for the pivot holder 11a, the angle θ3 between the flat surface that includes the flat portion 23a formed on the coupling shaft 17a and the flat surface X3 that is perpendicular to the swaging direction of the swaging jigs J1, J2 is set to a predetermined angle, for example, less than 90 degrees.

A method for assembling the pivot holders 11a, 11b and the pipe frame 18 of the wiper device 10 according to the first embodiment, that is, a method for manufacturing the wiper device 10 will now be described.

First, the coupling shafts 17a, 17b of the pivot holders 11a, 11b are inserted in the cylindrical ends 18a, 18b at both ends of the pipe frame 18.

Then, the position determining portions 23 of the coupling shafts 17a, 17b inserted in the cylindrical ends 18a, 18b of the pipe frame 18 are each held by the corresponding chuck 30 as shown in FIG. 5. Each chuck 30 includes the upper chuck member 31 and the lower chuck member 32. The holding surface 31a of the upper chuck member 31 contacts the flat portion 23a of the position determining portion 23, and the holding surface 32a of the lower chuck member 32 contacts the flat portion 23d, which is opposite to the flat portion 23a with respect to the axis L1. Thus, the pivot holders 11a, 11b are each held by the corresponding chuck 30. At this time, the upper chuck member 31 moves, and the lower chuck member 32 does not move. In the first embodiment, holding surfaces 32b, 32c are formed on both sides of the holding surface 32a of each lower chuck member 32 to be continuous with the holding surface 32a. The holding surfaces 32b, 32c correspond to the pair of flat portions 23c, 23e adjacent to the flat portion 23d of each position determining portion 23. That is, each lower chuck member 32 has a concave shape. Thus, since the holding surfaces 32b, 32c of each lower chuck member 32 contact the flat portions 23c, 23e of the corresponding position determining portion 23, the holding force of the chucks 30 for holding the coupling shafts 17a, 17b, that is, the pivot holders 11a, 11b is increased.

The pivot holders 11a, 11b held by the chucks 30 are rotated as required about the axis L1 to an appropriate position such that the flat portions 23a, 23d of each of the coupling shafts 17a, 17b have the predetermined angle θ3 with respect to the flat surface X3 perpendicular to the swaging direction.

Then, as shown in FIGS. 3 and 6, the swaging jigs J1, J2 are moved in a direction to approach each other (swaging direction) until at least parts of the swaging jigs J1, J2 contact each other. Accordingly, the pipe frame 18 is plastically deformed following the coupling shafts 17a, 17b, and the coupling shafts 17a, 17b are simultaneously swaged to the pipe frame 18. More specifically, swaging portions J1a, J2a of the swaging jigs J1, J2 press the pipe frame 18 toward the axis L1, that is, radially inward to plastically deform the pipe frame 18, and form the fitting protrusions 18c. The fitting protrusions 18c are fitted to the fitting recesses 17c of the coupling shafts 17a, 17b, so that the pipe frame 18 is secured to the coupling shafts 17a, 17b, that is, the pivot holders 11a, 11b.

The advantages of the first embodiment will now be described.

(1) The coupling shafts 17a, 17b of the pivot holders 11a, 11b are swaged to the cylindrical ends 18a, 18b of the pipe frame 18. The coupling shafts 17a, 17b include the fitting recesses 17c and flat portions 23a, 23d, which are formed at sections of the coupling shafts 17a, 17b exposed from the pipe frame 18. The flat portions 23a, 23d are parallel to the axis of the coupling shafts 17a, 17b, and have the predetermined angle θ3 with respect to the flat surface X3 perpendicular to the swaging direction. Each chuck 30 holds the corresponding one of the coupling shafts 17a, 17b via the flat portions 23a, 23d. Thus, even when the pivot shafts 12a, 12b are set to any angle, the angle θ3 between the flat portions 23a, 23d and the flat surface X3 perpendicular to the swaging direction is maintained to be constant. Thus, even if the type of the wiper device varies depending on the type of the vehicle, and the angles of the pivot shafts 12a, 12b, that is, the angles of the axes K1, K2 of the sleeve portions 13a, 13b of the pivot holders 11a, 11b are different, the common swaging jigs J1, J2 can be used to couple the pivot holders 11a, 11b to the pipe frame 18 by swaging. Thus, when the angles of the axes K1, K2 of the sleeve portions 13a, 13b vary depending on the wiper device of each type of vehicle, the conventionally required holding angle is easily adjusted, and the coupling shafts 17a, 17b of the pivot holders 11a, 11b are easily and promptly swaged to the pipe frame 18.

(2) The coupling shafts 17a, 17b each include a first flat portion, which is the flat portion 23a, and a second flat portion, which is the flat portion 23d. The flat portions 23a, 23d are parallel to the axis L1, and face each other with the axis L1 of the coupling shafts 17a, 17b located in between. Thus, since there are the pairs of flat portions 23a, 23d parallel to the axis L1, the coupling shafts 17a, 17b are held in a more stable manner with the chucks 30.

(3) The coupling shafts 17a, 17b are respectively inserted in the cylindrical ends 18a, 18b at both ends of the pipe frame 18. In this state, the coupling shafts 17a, 17b are simultaneously swaged to the pipe frame 18 by the swaging jigs J1, J2. Thus, for example, as compared to a case in which the coupling shafts 17a, 17b are separately swaged to the cylindrical ends 18a, 18b of the pipe frame 18, the number of processes required for swaging using the swaging jigs J1, J2 is reduced.

(Second Embodiment)

A second embodiment of the present invention will now be described with reference to the drawings. The second embodiment differs from the first embodiment in the position where the flat portions are formed, and in the swaging jigs and the chucks. The differences will mainly be discussed, and like or the same reference numerals are given to those components that are like or the same as the corresponding components of the first embodiment and detailed explanations are omitted. The structures of the coupling shafts 17a, 17b according to the second embodiment are basically the same except that the angles θ1, θ2 of the axes K1, K2 of the pivot shafts 12a, 12b with respect to the axis L1 of the coupling shafts 17a, 17b differ from each other. Thus, the coupling shaft 17b is shown in FIGS. 8 to 13, and illustration of the detailed shape of the coupling shaft 17a is omitted.

Figure 7:
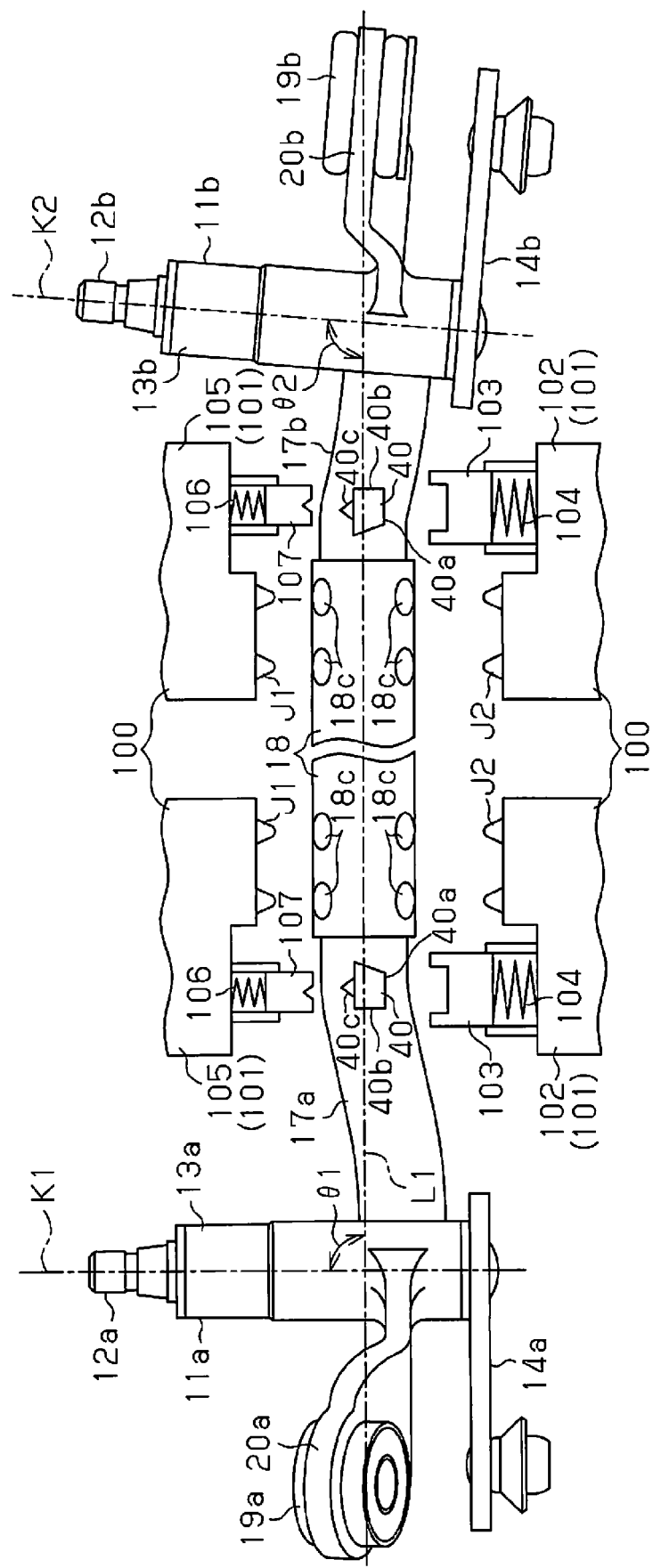
FIG. 7 is a front view illustrating a wiper device according to a second embodiment of the present invention.
Figure 8:
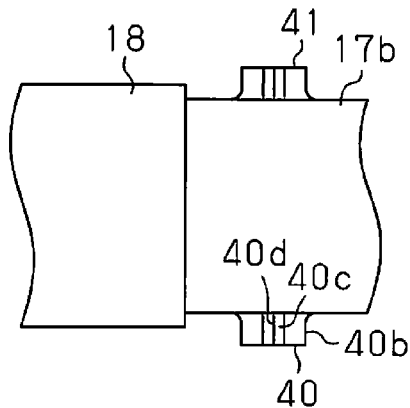
FIG. 8 is a plan view illustrating a main part of the wiper device of FIG. 7.
Figure 9:
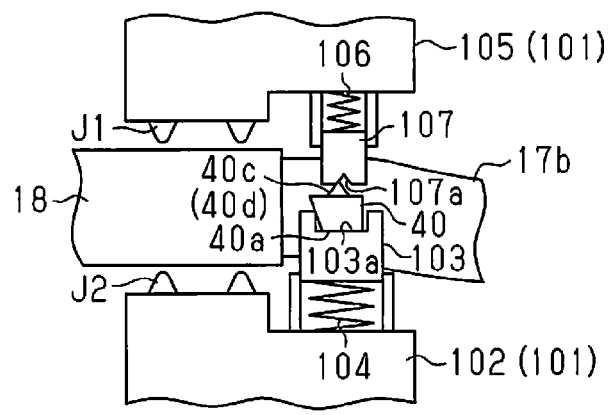
FIG. 9 is an explanatory side view of a method for manufacturing the wiper device of FIG. 7.

The coupling shaft 17b of the pivot holder 11b according to the second embodiment includes a first extension 40 and a second extension 41 at a section exposed from the pipe frame 18 as shown in FIGS. 7 and 8. The first extension 40 extends from the coupling shaft 17b in a direction perpendicular to the axis L1, which is the longitudinal direction of the coupling shaft 17b. The second extension 41 is formed on the opposite side of the coupling shaft 17b from the first extension 40, and extends from the coupling shaft 17b in a direction perpendicular to the axis L1. The first and second extensions 40, 41 are symmetrical with respect to the axis L1. Thus, one of the extensions, that is, the first extension 40 will mainly be discussed below.

The first extension 40 includes a flat portion 40a, which is parallel to the axis L1, an orthogonal surface 40b, which is an intersecting surface that is perpendicular to the flat portion 40a, and a projection 40d, which has an inclined surface 40c inclined with respect to the swaging direction.

The flat portion 40a has a predetermined angle with respect to the swaging direction regardless of the inclination of the pivot shafts 12a, 12b on which the proximal ends of the wiper arms (not shown) are mounted. The orthogonal surface 40b is a surface continuous with one end of the flat portion 40a in the direction of the axis L1, and is formed closer to the pivot shaft 12b than the flat portion 40a. The projection 40d is formed on the opposite side of the first extension 40 from the flat portion 40a, and includes the inclined surface 40c, which has a tapered in a direction away from the flat portion 40a. The inclined surface 40c is inclined with respect to the same direction as the swaging direction, that is, the chucking direction of later described chucks 101.

The first and second extensions 40, 41 are held by a holding tool, which is the chucks 101 in the second embodiment, and the position is determined in the direction of the axis L1.

A method for assembling the pivot holders 11a, 11b and the pipe frame 18 of the wiper device 10, that is, a method for manufacturing the wiper device 10 according to the second embodiment will now be described. A pair of the chucks 101 and the swaging jigs J1, J2 corresponding to the pivot holders 11a, 11b are movable in the direction parallel to the axis L1. Thus, a manufacturing apparatus 100 is applicable to the pipe frame 18 having various length. According to the manufacturing apparatus 100, the chucks 101 are formed integrally with the swaging jigs J1, J2 such that the chucks 101 and the swaging jigs J1, J2 are integrally movable in the swaging direction during assembly.

First, the coupling shafts 17a, 17b of the pivot holders 11a, 11b are inserted in the cylindrical ends 18a, 18b at both ends of the pipe frame 18.

Figure 10:
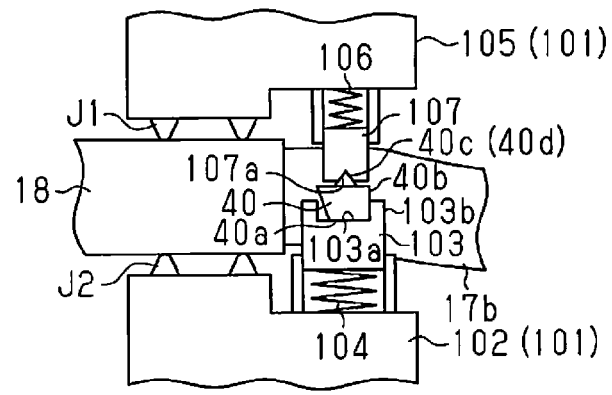
FIG. 10 is an explanatory side view of the method for manufacturing the wiper device of FIG. 7.

Then, as shown in FIG. 10, the flat portions 40a of the first and second extensions 40, 41 of each of the coupling shafts 17a, 17b inserted in the cylindrical ends 18a, 18b of the pipe frame 18 contact a lower chuck member 102 of the corresponding chuck 101. Each lower chuck member 102 includes a holding recess 103 and a damper 104, which supports the holding recess 103. The holding recess 103 includes a holding surface 103a, which contacts the flat portion 40a, and a pair of side walls 103b, which extend toward the first and second extensions 40, 41 from both ends of the holding surface 103a in the direction of the axis L1. The holding recess 103 has a concave shape.

Then, an upper chuck member 105 of each chuck 101 is moved in the direction to approach the lower chuck member 102, that is, in the swaging direction. Each upper chuck member 105 includes a damper 106, and a position determining recess 107, which is supported by the damper 106. Each position determining recess 107 includes an inclined surface 107a, which is tapered in a direction away from the damper 106. Thus, when each upper chuck member 105 moves toward the corresponding lower chuck member 102 as described above, each position determining recess 107 contacts the associated projection 40d of the first and second extensions 40, 41 as shown in FIG. 10. When each upper chuck member 105 is further moved in the same direction, the inclined surface 107a of each position determining recess 107 applies force in the moving direction (swaging direction) of the chuck members 102, 105 to the corresponding inclined surface 40c, which forms the projection 40d of the first and second extensions 40, 41. Thus, force in the longitudinal direction of the coupling shaft 17b, that is, in the direction of the axis L1 is generated as a component of the force. Thus, the coupling shaft 17b (pivot holder 11b) including the first and second extensions 40, 41 is moved via the projections 40d that contact the position determining recesses 107 of the upper chuck members 105 in the longitudinal direction of the coupling shaft 17b, that is, in the direction of the axis L1. At this time, as shown in FIG. 10, the first and second extensions 40, 41 move in the same direction until each intersecting surface, which is the orthogonal surface 40b, abuts against one of the side walls 103b of the corresponding lower chuck member 102 in the longitudinal direction of the coupling shaft 17b. The flat portion 40a and the projection 40d are sandwiched by the associated chuck members 102, 105 in the direction (swaging direction) in which the chuck members 102, 105 approach each other. The first and second extensions 40, 41 are held in this manner. Furthermore, one of the side walls 103b of each lower chuck member 102 abuts against the associated orthogonal surface 40b in the longitudinal direction. Thus, the holding force of the chuck members 102, 105 for holding the coupling shafts 17a, 17b is further increased, and the position of the coupling shafts 17a, 17b is determined.

Figure 11:
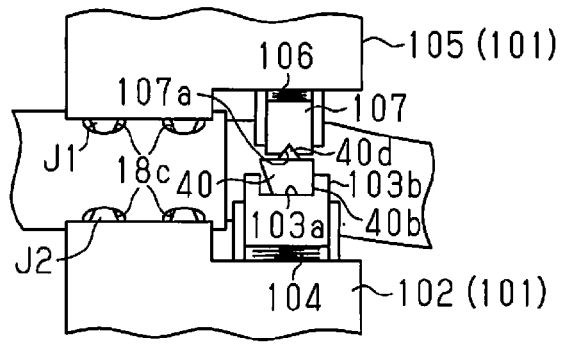
FIG. 11 is an explanatory side view of the method for manufacturing the wiper device of FIG. 7.

Thereafter, as shown in FIG. 11, the swaging jigs J1, J2, which move integrally with the chuck members 102, 105, are further moved in the direction (swaging direction) to approach each other. Accordingly, the pipe frame 18 is plastically deformed following the coupling shafts 17a, 17b, and the coupling shafts 17a, 17b are simultaneously swaged to the pipe frame 18. At this time, the chuck members 102, 105 are also moved in the same direction as the direction in which the swaging jigs J1, J2 are moved. However, the dampers 104, 106 of the chuck members 102, 105 reduce the force applied to the first and second extensions 40, 41.

As described above, the second embodiment has the following advantages in addition to the advantages (1) and (3) of the first embodiment.

(4) The first and second extensions 40, 41 each include the intersecting surface, which is the orthogonal surface 40b in the second embodiment. Therefore, the position of the coupling shafts 17a, 17b with respect to the pipe frame 18 (cylindrical ends 18a, 18b) in the longitudinal direction of the coupling shafts 17a, 17b is determined with reference to the orthogonal surfaces 40b. Since the flat portion 40a and the orthogonal surface 40b, which is orthogonal to the flat portion 40a, that is, the surfaces oriented in several directions are held by the chuck members 102, 105, the holding force of the chuck members 102, 105 for holding the coupling shafts 17a, 17b is increased and the accuracy in determining the position in several directions is ensured.

(5) The position determining process is executed during the swaging process. In the position determining process, the orthogonal surface 40b of each of the first and second extensions 40, 41 is brought into contact with the position determining surface, which is the side wall 103b, of the corresponding lower chuck member 102 to determine the position in the longitudinal direction of the coupling shafts 17a, 17b. Thus, the position is reliably determined during swaging without providing other process between the position determining process and the swaging process. This inhibits positional displacement caused by providing other process between the position determining process and the swaging process.

(6) Each upper chuck member 105 moves in the swaging direction, and contacts the inclined surface 40c of the projection 40d, which is formed on each of the first and second extensions 40, 41. Thus, the coupling shafts 17a, 17b move until the associated orthogonal surface 40b abuts against one of the side walls 103b of the corresponding lower chuck member 102 in the longitudinal direction of the coupling shafts 17a, 17b. In a state where the flat portions 40a and the orthogonal surfaces 40b of the first and second extensions 40, 41 are brought into surface-contact with and held by the chuck members 102, 105, the coupling shafts 17a, 17b are swaged to the pipe frame 18 by the swaging jigs J1, J2. In this manner, since the position of the coupling shafts 17a, 17b are determined simultaneously with holding the flat portions 40a with the chuck members 102, 105, the number of processes is prevented from increasing.

(7) Since the chuck members 102, 105 and the swaging jigs J1, J2 are formed to be movable in the same direction, the structural restriction of the wiper device 10 is reduced by restricting the moving direction of the chuck members 102, 105 and the swaging jigs J1, J2.

(8) Since the chuck members 102, 105 and the swaging jigs J1, J2 are integrally movable, holding of the wiper device 10 with the chuck member 102 and swaging with the swaging jigs J1, J2 are performed in a series of operation.

The illustrated embodiments of the present invention may be modified as follows.

In the first embodiment, each position determining portion 23 includes six flat portions 23a to 23f, and the cross-section in the direction perpendicular to the axis L1 is substantially a hexagon. However, the cross-section may be changed to an octagon or any other polygon. Each position determining portion 23 may include a pair of flat portions and a pair of curved surfaces, which connect the flat portions. Each position determining portion 23 may also have a substantially D-like shape including a single flat portion and a single curved surface.

In each of the illustrated embodiments, the coupling shafts 17a, 17b of the pivot holders 11a, 11b are simultaneously swaged to the cylindrical ends 18a, 18b of the pipe frame 18 with the swaging jigs J1, J2. However, the present invention is not limited to this. For example, after the coupling shaft 17a of the pivot holder 11 a is swaged to one of the cylindrical ends of the pipe frame 18, that is, the cylindrical end 18a, the coupling shaft 17b of the pivot holder 11b may be swaged to the other cylindrical end of the pipe frame 18, that is, the cylindrical end 18b.

In the first embodiment, the chuck 30 preferably includes the lower chuck members 32 that are not movable and the upper chuck members 31 that are movable. Instead, both chuck members may be movable. Also, the upper chuck members do not necessarily have to be movable, and the lower chuck members may be movable. Furthermore, the direction in which the chucks 30 hold the position determining portions 23 does not necessarily have to be only the vertical direction, but may be three or more directions as long as the flat portions of the coupling shafts are held with respect to the flat surface X3, which is perpendicular to the swaging direction, by a predetermined angle θ3.

Figure 12:
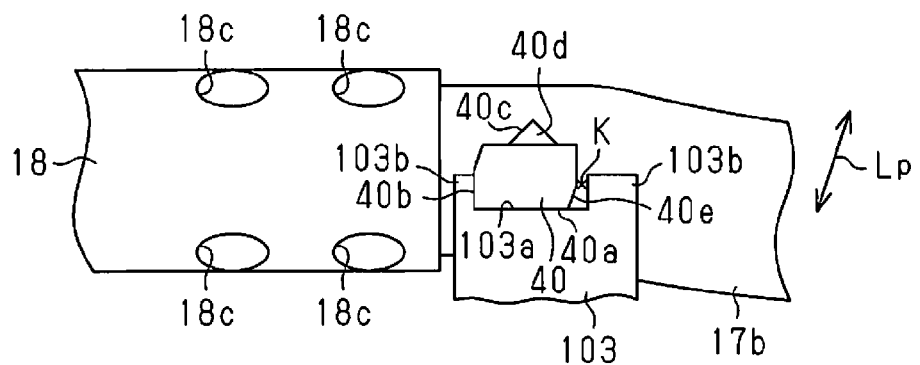
FIG. 12 is a side view illustrating a main part of a wiper device according to a modification.
Figure 13:
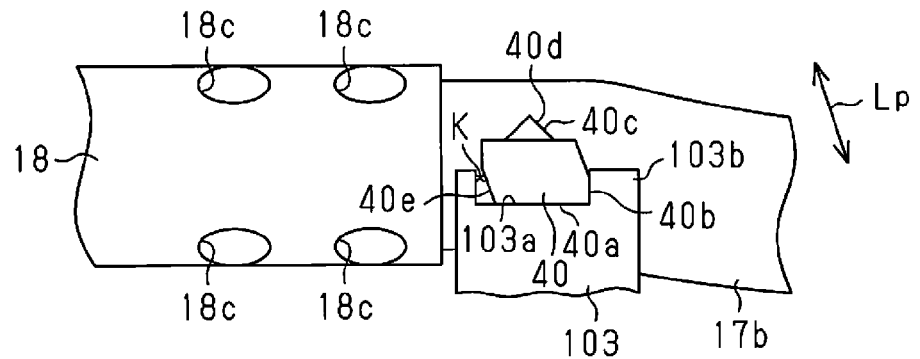
FIG. 13 is a side view illustrating the main part of the wiper device according to another modification.

In the second embodiment, although not particularly mentioned, an inclined surface 40e is preferably formed on the opposite side of the first extension 40 from the orthogonal surface 40b in the longitudinal direction (direction of the axis L1) of the coupling shaft 17b as shown in for example, FIGS. 12 and 13. In this case, the second extension 41 has the same shape as the first extension 40. With this configuration, for example, in a case in which a parting direction Lp of a mold (not shown) for molding the pivot holder 11b is the same as the inclination direction of the pivot holder 11b, the first and second extensions 40, 41 are prevented from having undercuts generated when parting the mold by making the inclination direction of the inclined surface 40e equal to that of the sleeve portion 13b of the pivot holder 11b. Thus, the first and second extensions 40, 41 are prevented from being deformed or chipped.

According to the manufacturing apparatus 100 of the second embodiment, the chucks 101 for adjusting the position of the coupling shafts 17a, 17b in the longitudinal direction are formed integrally with the swaging jigs J1, J2. However, the chucks 101 may be separate from the swaging jigs J1, J2. In this case, the position of the coupling shafts 17a, 17b with respect to the pipe frame 18 is determined first with the chucks 101, and swaging is then performed with the swaging jigs J1, J2 while holding the coupling shafts 17a, 17b.

Also, in the second embodiment, since the chucks 101 and the swaging jigs J1, J2 are integrally formed, the angle θ3 between the flat surface X2 and the flat surface X3 is 0° (the predetermined angle is 0°, that is, the chuck direction and the swaging direction are the same direction). However, the chucks 101 and the swaging jigs J1, J2 may be separate bodies, and the angle θ3 between the flat surface X2 and the flat surface X3 may be other than 0° (a predetermined angle may be other than 0°, that is, the chuck direction and the swaging direction may be different directions).

The invention claimed is:

1. A wiper device comprising:
a pivot shaft, to which a wiper arm is secured;
a pivot holder, which rotationally supports the pivot shaft and includes a coupling shaft; and
a pipe frame, the pipe frame including a cylindrical end coupled to the coupling shaft,
wherein the coupling shaft includes a swaging portion, which is swaged to the cylindrical end, and a flat portion located at part of the coupling shaft exposed from the pipe frame,
the flat portion has a predetermined angle with respect to a swaging direction of the swaging, and is parallel to an axis of the coupling shaft,
the flat portion includes a first extension, which extends from the coupling shaft in a direction intersecting the axis of the coupling shaft, and a second extension, which extends on the opposite side of the coupling shaft from the first extension, and
the first and second extensions each include an intersecting surface, which intersects the axis of the coupling shaft, and an inclined surface, which is inclined with respect to swaging direction to generate force in the axial direction of the coupling shaft as a component of the force in the swaging direction.

2. The wiper device according to claim 1, wherein the flat portion includes a first flat portion and a second flat portion, and the first flat portion and the second flat portion are parallel to the axis of the coupling shaft and face each other with the axis located in between.

3. The wiper device according to claim 1, wherein the flat portion is formed such that the angle between the flat portion and a flat surface perpendicular to the swaging direction is less than 90 degrees.

4. A wiper device comprising:
a pivot shaft, to which a wiper arm is secured;
a pivot holder, which rotationally supports the pivot shaft and includes a coupling shaft; and
a pipe frame, the pipe frame including a cylindrical end coupled to the coupling shaft,
wherein the coupling shaft includes a swaging portion, which is swaged to the cylindrical end, and a flat portion located at part of the coupling shaft exposed from the pipe frame,
the flat portion has a predetermined angle with respect to a swaging direction of the swaging, and is parallel to an axis of the coupling shaft,
the flat portion includes an extension, which extends from the coupling shaft in a direction intersecting the axis of the coupling shaft, and
the extension includes an intersecting surface, which intersects the axis of the coupling shaft, and an inclined surface, which is inclined with respect to the swaging direction to generate force in the axial direction of the coupling shaft as a component of the force in the swaging direction.

* * * * *